United States Patent [19]
Ramirez

[11] Patent Number: 5,319,291
[45] Date of Patent: Jun. 7, 1994

[54] BRUSHLESS MOTOR UTILIZING FET DRIVERS

[75] Inventor: Frank D. Ramirez, Stamford, Conn.

[73] Assignee: Pitney Bowes Inc., Stamford, Conn.

[21] Appl. No.: 18,600

[22] Filed: Feb. 17, 1993

[51] Int. Cl.$^5$ .............................................. H02P 7/00
[52] U.S. Cl. .................................. 318/254; 318/439
[58] Field of Search ................... 318/254, 138, 439

[56] References Cited

U.S. PATENT DOCUMENTS

| | | | |
|---|---|---|---|
| 4,030,005 | 6/1977 | Doemen | 318/138 |
| 4,379,984 | 4/1983 | Muller | 318/254 |
| 4,544,868 | 10/1985 | Murty | 318/254 |
| 4,633,151 | 12/1986 | Crook | 318/254 |
| 4,748,388 | 5/1988 | Muller | 318/254 |
| 4,782,272 | 11/1988 | Buckley et al. | 318/254 |
| 4,870,332 | 9/1989 | Coghran et al. | 318/254 |
| 4,988,905 | 1/1991 | Tolmie, Jr. | 310/68 B |
| 5,079,487 | 1/1992 | Malang | 318/254 |

Primary Examiner—Jonathan Wysocki
Attorney, Agent, or Firm—Charles G. Parks, Jr.; Melvin J. Scolnick

[57] ABSTRACT

A programmable logic device for commutating a brushless motor having an encoder with a plurality of Hall-effect sensors operative for providing commutation information to a motor controller for commutation of the motor by sequencing of a plurality of complementary FET's for energizing stator windings of the brushless motor comprises a Hall-effect sensor decode circuit and a deadtime generator. The sensor decode circuit is operative for commutation of motor output control signals in accordance with direction and PWM signals from a system controller and commutation information from the Hall-effect sensors. The deadtime generator provides timed blanking for ensuring that each respective one of said plurality of FET's is turned completely off before its complementary FET is turned on to protect against destructive currents.

4 Claims, 2 Drawing Sheets

DIR=0

DIR=1

BRUSHLESS MOTOR UTILIZING FET DRIVERS

FIELD OF THE INVENTION

The invention relates to brushless motors having electric commutation means.

BACKGROUND OF THE INVENTION

Brushless motors are well known. Conventionally, these motors comprise a housing rotatably supporting a rotor carrying a plurality of permanent magnets arranged in pole pairs. These magnets supply the field flux. A plurality of stators are are arranged about the rotor. Each stator has stator windings such that the interaction of current passing through the winding with the flux of the rotor magnets produces torque if the current through each stator winding is timed correctly with respect to rotor position.

Typically, brushless motors provide the necessary commutation position feedback information to a motor controller through the use of either an optical encoder mounted on the end of the motor or through Hall effect sensors placed in close proximity to a disc having a magnetic pattern thereon which rotates with the rotor.

The details of a brushless motor of this type using Hall-effect sensors for commutation information are described, for example, in U.S. Pat. No. 4,988,905 assigned to the owner of the present application.

In such brushless motors there is a necessity for decoding the output of the Hall-effect sensors in order to commutate the current through the various stator windings at the appropriate instant. U.S. Pat. No. 5,079,487 to Malang suggests that the motor drive can be commutated through use of a Programmable Logic Device. The device of this reference is constructed utilizing transistor technology and it is further suggested that MOSFETS may be substituted. The teaching of Malang is that the "back driving" of the power supply may be avoided by appropriate selection of the states of the regulating transistors.

There is associated with the use of MOSFETS a problem not recognized by Malang. Since high currents are being switched in the outputs FETS, if one of the two devices is not turned completely off before its complementary device is switched on, potentially destructive currents can exist.

U.S. Pat. No. 4,5644,868 also teaches the use of a programmable logic array to energize the windings. In this reference pulse-width modulation circuit monitors the current supplied to the motor and interrupts motor energization whenever the current rises above a reference level. The circuit is also used to provide regenerative braking whenever the direction of motor rotation is to be reversed. This reference also fails to address the problems with using FETS.

SUMMARY OF THE INVENTION

It is therefore an object of the invention to provide a low cost apparatus for commutating a brushless motor and more particularly a method and apparatus utilizing FET drivers.

It has been found that a novel and effective commutating of a motor using FET drivers can be provided by a Hall-effect sensor state decoder and a deadtime generator for direction reversal protection.

Thus, the aforementioned and other objects are accomplished by providing in a brushless motor having encoder means comprising a plurality of Hall-effect sensors operative for providing commutation information to a motor controller for commutation of the motor by sequencing of a plurality of complementary FET's for energizing stator windings of the brushless motor, the improvement comprising a programmable logic device which includes a Hall-effect sensor decode circuit, said second decode circuit being operative for commutation of motor output control signals in accordance with direction and PWM signals from a system controller and commutation information from the Hall-effect sensors, and a deadtime generator, said deadtime generator including timed blanking means for ensuring that each respective one of said plurality of FET's is turned completely off before its complementary FET is turned on.

DESCRIPTION OF THE PREFERRED EMBODIMENT

Figure 1:
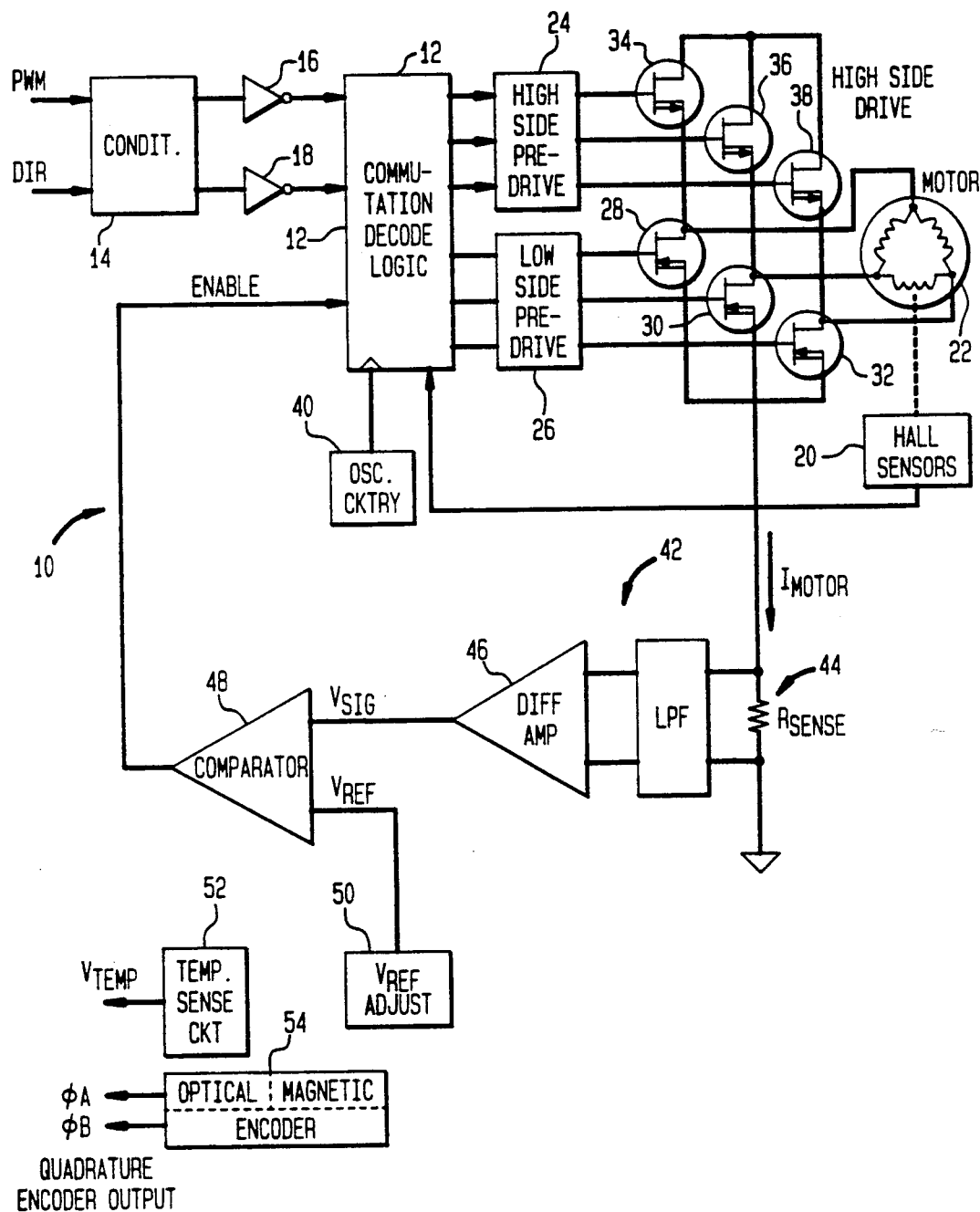
FIG. 1 is a block diagram of a commutation board which may include a programmable logic device in accordance with the invention.

In FIG. 1, there is shown generally at 10 a board which is adapted to be fixed to the end of a brushless motor. The brushless motor comprises a rotor on which permanent magnets are mounted arranged in pole pairs. These magnets supply field flux. The stator contains stator windings and is designed in such a way that the interaction of the current through the windings and the magnetic flux produces a torque vector if the current is timed in correct relationship with the position of the rotor relative to the stator windings. The position is sensed by three Hall-effect sensors that are mounted in close proximity to a magnetic disk having a magnetic pattern. The details of the motor and sensor arrangement are disclosed in U.S. Pat. No. 4,988,905 specifically incorporated herein by reference.

Figure 2:
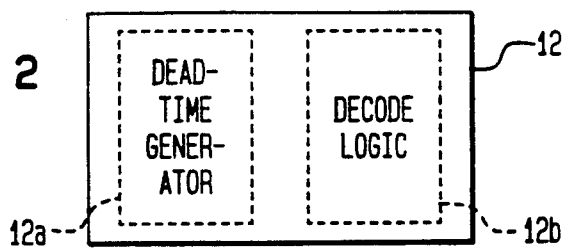
FIG. 2 is a block diagram of the programmable logic device in accordance with the invention.

As shown in FIG. 1, commutation-decode-logic device 12 receives a Direction signal (DIR) and a PWM signal from a motor controller (not shown) by way of suitable conventional buffering means indicated as signal conditioner 14 and inverters 16 and 18. The commutation-decode-logic device 12 may suitably be a PAL-CE22V10 device and as best seen in FIG. 2, includes the following functional blocks: Hall-effect sensor state decode logic for receiving signal inputs from the Hall-effect sensors shown at block 20 for proper commutation of the motor 22, a deadtime generator 23 for direction reversal protection which includes blanking section 24, and an output section 25 to control the FET High-Side Pre-Drive circuitry 26 and the Low--Side Pre--Drive circuitry 27.

While the invention is shown here as a separate device, it will be understood that it may be fabricated in accordance with the circuit shown and included as a part of a packaged device described and claimed in U.S. Patent Application Serial No. 08/018,597, entitled INTEGRATED CIRCUIT MOTOR DRIVER FOR A BRUSHLESS MOTOR filed on even date herewith and assigned to the assignee of the instant application and specifically incorporated herein by reference.

The output drive stage comprises six discrete power FET's. The lower (low-side) power FET's shown at 28, 30 and 32 are suitably MTP3055 N-channel devices and are referenced to Ground. As such, it will be understood that a signal that switches between +12 volts and ground is required on the gates of these devices to turn them on and off. The pre-driver block 26 suitably comprises a single-stage, small-signal 2N7002 FET for each of these power devices arranged as shown.

The upper (high-side) FET's 34, 36, and 38 are suitably MTP2955 P-channel devices and require a +12V differential developed across the gate-source junction. For a 42V supply voltage, the gate voltage must thus switch between 42V and 30V. The pre-driver block 24 then suitably comprises an open drain FET for each power FET with the +12V differential being developed using a resistor divider. This signal is then input to an emitter follower push-pull stage which drives the gate directly.

Oscillator 40 provides a system clock to synchronize the logic within the commutation-decode-logic device 12 and as a reference for time delays to prevent FET cross conduction when motor direction is changed. Conveniently, the oscillator 40 may be a 2-gate RC a stable multivibrator arranged to oscillate at a frequency of 250 kHz.

An overcurrent detector and current limiter circuit included on the board 10 is shown generally at 42. Such a current limiter has been found to be desirable to protect both the motor and the driver circuitry. The circuit 42 monitors the motor current and shuts off the outputs if the current exceeds a predetermined limit. As seen in FIG. 1, the current through the motor windings will produce a voltage across sense resistor 44. This sensed voltage is amplified and filtered by differential amplifier 46 to provide an input to comparator 48 with hysteresis and compared to a voltage reference 48 with hysteresis and if desired, that corresponds to a desired current limit value. The output of the comparator 48 is provided as an enable input to the commutation-decode-logic device 12 where it may be used to disable the outputs that control the high-side P-channel FET's 34, 36, and 38.

Turning now to a further discussion of the commutation-decode-logic device 12 illustrate in the block diagram of FIG. 2. As shown the device comprises two functional blocks; a dead-time generator 12a and a commutation decoder logic circuit 12b. The truth table shown as Table 1 illustrates the desirable outputs for every combination of inputs. As brought out previously, the commutation logic decodes the three Hall-effect sensor inputs and turns on the appropriate outputs to properly commutate the motor 22 in response to the PWM and DIR inputs from the motor controller. The Hall-effect sensor outputs are preferably gray-coded to minimize the possibility of invalid transitions. In Table 1, the SNK outputs are provided for control of the N-channel (low-side) FET's while the SRC outputs are used to control the P-channel (high-side) FET's.

TABLE 1

| INPUTS | | | | | | OUTPUTS | | | | | |
|---|---|---|---|---|---|---|---|---|---|---|---|
| EN | PWM | DIR | H1 | H2 | H3 | SRC1 | SRC2 | SRC3 | SNK1 | SNK2 | SNK3 |
| 1 | 0 | 1 | 1 | 1 | 0 | 0 | 1 | 0 | 0 | 1 | 1 |
| 1 | 0 | 1 | 0 | 1 | 0 | 0 | 1 | 0 | 1 | 1 | 0 |
| 1 | 0 | 1 | 0 | 1 | 1 | 1 | 0 | 0 | 1 | 1 | 0 |
| 1 | 0 | 1 | 0 | 0 | 1 | 1 | 0 | 0 | 1 | 0 | 1 |
| 1 | 0 | 1 | 1 | 0 | 1 | 0 | 0 | 1 | 1 | 0 | 1 |
| 1 | 0 | 1 | 1 | 0 | 0 | 0 | 0 | 1 | 0 | 1 | 1 |
| 1 | 0 | 0 | 1 | 1 | 0 | 1 | 0 | 0 | 1 | 0 | 1 |
| 1 | 0 | 0 | 0 | 1 | 0 | 0 | 0 | 1 | 1 | 0 | 1 |
| 1 | 0 | 0 | 0 | 1 | 1 | 0 | 0 | 1 | 0 | 1 | 1 |
| 1 | 0 | 0 | 0 | 0 | 1 | 0 | 1 | 0 | 0 | 1 | 1 |
| 1 | 0 | 0 | 1 | 0 | 1 | 0 | 1 | 0 | 1 | 1 | 0 |
| 1 | 0 | 0 | 1 | 0 | 0 | 1 | 0 | 0 | 1 | 1 | 0 |
| 1 | 1 | 1 | 1 | 1 | 0 | 0 | 0 | 0 | 0 | 1 | 1 |
| 1 | 1 | 1 | 0 | 1 | 0 | 0 | 0 | 0 | 1 | 1 | 0 |
| 1 | 1 | 1 | 0 | 1 | 1 | 0 | 0 | 0 | 1 | 1 | 0 |
| 1 | 1 | 1 | 0 | 0 | 1 | 0 | 0 | 0 | 1 | 0 | 1 |
| 1 | 1 | 1 | 1 | 0 | 1 | 0 | 0 | 0 | 1 | 0 | 1 |
| 1 | 1 | 1 | 1 | 0 | 0 | 0 | 0 | 0 | 0 | 1 | 1 |
| 1 | 1 | 0 | 1 | 1 | 0 | 0 | 0 | 0 | 1 | 0 | 1 |
| 1 | 1 | 0 | 0 | 1 | 0 | 0 | 0 | 0 | 1 | 0 | 1 |
| 1 | 1 | 0 | 0 | 1 | 1 | 0 | 0 | 0 | 0 | 1 | 1 |
| 1 | 1 | 0 | 0 | 0 | 1 | 0 | 0 | 0 | 0 | 1 | 1 |
| 1 | 1 | 0 | 1 | 0 | 1 | 0 | 0 | 0 | 1 | 1 | 0 |
| 1 | 1 | 0 | 1 | 0 | 0 | 0 | 0 | 0 | 1 | 1 | 0 |
| 0 | x | 1 | 1 | 1 | 0 | 0 | 0 | 0 | 0 | 1 | 1 |
| 0 | x | 1 | 0 | 1 | 0 | 0 | 0 | 0 | 1 | 1 | 0 |
| 0 | x | 1 | 0 | 1 | 1 | 0 | 0 | 0 | 1 | 1 | 0 |
| 0 | x | 1 | 0 | 0 | 1 | 0 | 0 | 0 | 1 | 0 | 1 |
| 0 | x | 1 | 1 | 0 | 1 | 0 | 0 | 0 | 1 | 0 | 1 |
| 0 | x | 1 | 1 | 0 | 0 | 0 | 0 | 0 | 0 | 1 | 1 |
| 0 | x | 0 | 1 | 1 | 0 | 0 | 0 | 0 | 1 | 0 | 1 |
| 0 | x | 0 | 0 | 1 | 0 | 0 | 0 | 0 | 1 | 0 | 1 |
| 0 | x | 0 | 0 | 1 | 1 | 0 | 0 | 0 | 0 | 1 | 1 |
| 0 | x | 0 | 0 | 0 | 1 | 0 | 0 | 0 | 0 | 1 | 1 |
| 0 | x | 0 | 1 | 0 | 1 | 0 | 0 | 0 | 1 | 1 | 0 |
| 0 | x | 0 | 1 | 0 | 0 | 0 | 0 | 0 | 1 | 1 | 0 |
| x | x | x | 0 | 0 | 0 | 0 | 0 | 0 | 1 | 1 | 1 |
| x | x | x | 1 | 1 | 1 | 0 | 0 | 0 | 1 | 1 | 1 |

It will be appreciated from an inspection of Table 1 that the SRC outputs are turned on only when the PWM input is 0. When the PWM input is high, the SRC outputs are off. It has been discovered by chopping on the high side in this manner, ground noise may be minimized which results in more dependable operation. It has also been found that this design takes advantage of the better characteristics of the intrinsic diode of an N-channel FET.

it will be further appreciated that the SNK outputs are used for "steering", that is the SNK outputs are always enabled so that the sequence is determined by the state of the Hall-effect sensors. It must also be noted that in the illustrated embodiment, the SRC outputs are active high and the SNK outputs are active low.

Figure 3:
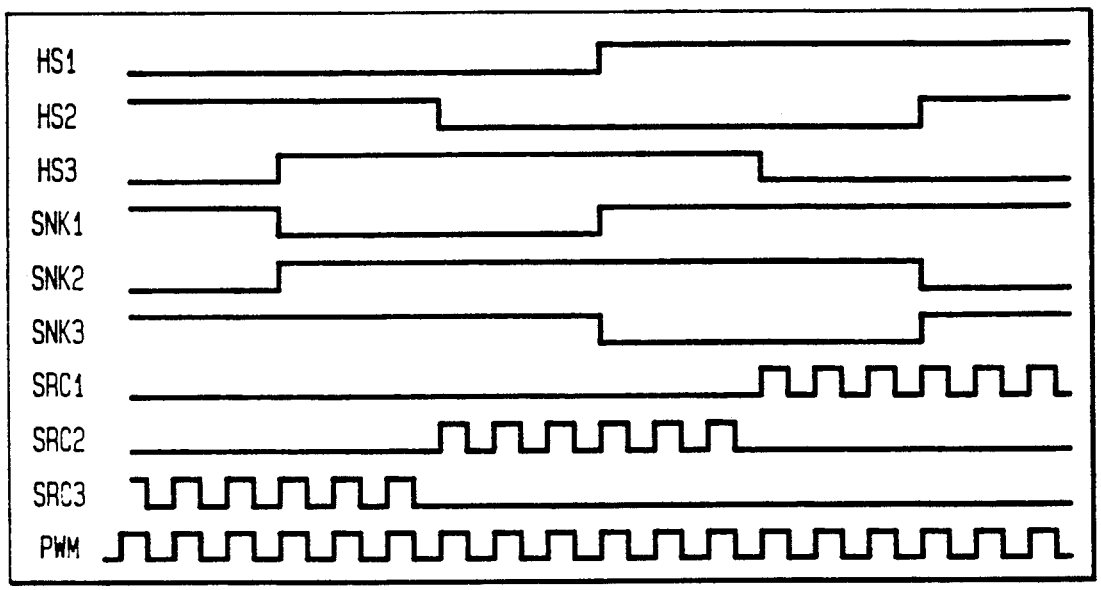
FIG. 3 illustrates representative waveforms for inputs and outputs in one direction of rotation.
Figure 4:
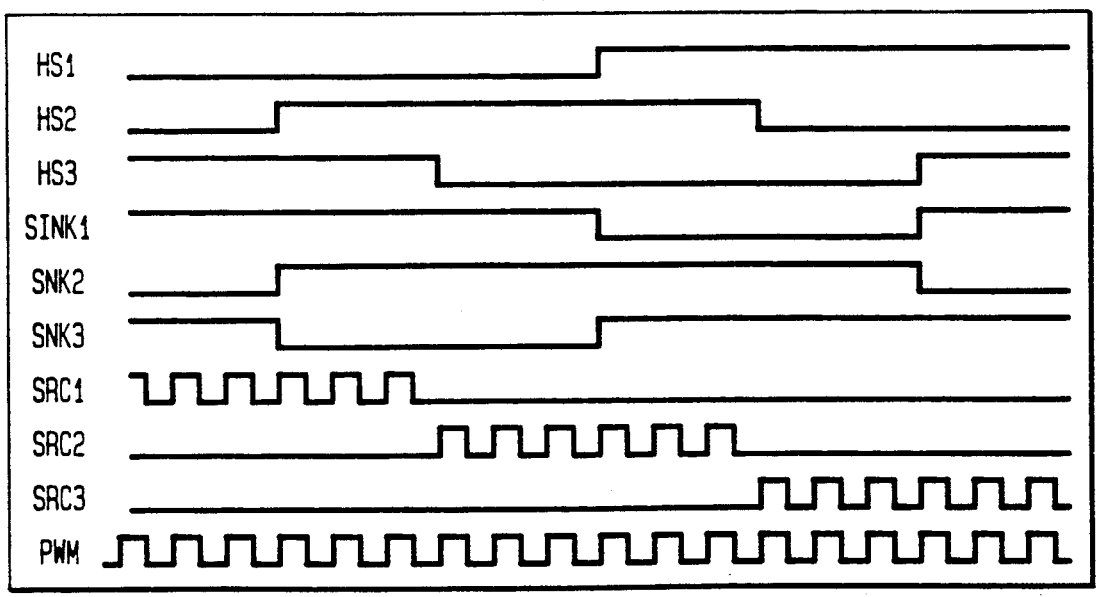
FIG. 4 illustrates representative waveforms for inputs and outputs in the opposite direction of rotation.

Since high currents are potentially being switched in the output FET's, if one of the two devices is not turned completely off before its complementary device is turned on, potentially destructive currents can exist. It has been found that this potentially destructive situation may be prevented by inserting a time delay in the sequencing of output signals. In accordance with this protective feature, it has been found to be sufficient that the outputs be enabled only when the DIR input is the same for two consecutive clock periods of the oscillator 40 and the PWM and Enable are both active. If the DIR input should change while both the PWM and Enable are active, then the SRC and SNK outputs are disabled until the DIR signal is stable for two consecutive clock periods. It will be understood that if desired, different clock periods and different clock frequencies may be utilized to provide an appropriate time delay to prevent shoot-through currents Representative waveforms of inputs and outputs are shown in FIGS. 3 and 4 for each direction of rotation. It is assumed that, in accordance with the discussion above, the DIR input has been valid for two consecutive clock periods since if that is not the case all outputs are off. It is apparent from these Figures that the "chopping" occurs only on the the SRC outputs, that is to say those outputs to the high-side FET's.

Returning now to FIG. 1, a temperature sense circuit 52 may be included on the board. Suitably circuit 52 may comprise a Negative Temperature Coefficient (NTC) surface mount thermistor with for example a nominal resistance of 5K at 25 degrees C. The thermistor may be configured as part of a resistive divider network such that an analog signal proportional to temperature may be generated. The output can be used to disable the motor; however, in the preferred embodiment, it is fed to the motor controller for use in determining the operating speed of the system in accordance with the invention disclosed in U.S. Patent Application Serial No. 08/018,574 entitled APPARATUS INCLUDING SYSTEM CONTROL OF MOTOR TEMPERATURE filed on even date herewith and assigned to the assignee of the present-invention.

The board may also include an optical encoder 54 for operation with the optical disk as described in U.S. Pat. No. 4,988,905 previously incorporated by reference herein to produce a two-channel TTL output in known manner. Additionally or in place of the optical encoder may be mounted the encoder arrangement described in U.S. Patent Application Ser. No. 08/018,599 entitled METHOD AND APPARATUS FOR GENERATING A QUADRATURE SIGNAL USING COMMUTATION SENSORS filed on even date herewith and assigned to the assignee of the present invention.

What is claimed is:

1. In a brushless motor having encoder means comprising a plurality of Hall-effect sensors operative for providing commutation information to a motor controller for commutation of the motor by sequencing of a plurality of complentary FET's for energizing stator windings of the brushless motor, the improvement comprising a programmable logic device which includes a Hall-effect sensor decode circuit, said sensor decode circuit being operative for commutation of motor output control signals in accordance with direction and PWM signals from a system controller and commutation information from the Hall-effect sensors, and a deadline generator, said deadtime generator including timed blanking means for ensuring that each respective one of said plurality of FET's is turned completely off before its complementary FET is turned on, a timing means wherein the blanking means is operable for blanking the output until the direction signal is stable for a predetermined number of clocks periods of said timing means, and, said timing means being a two-gate RC astable multivibrator.

2. The apparatus of claim 1 wherein the programmable logic device is connected to a plurality of high-side P-channel FET's and to a complementary plurality of low-side N-channel FET's.

3. The apparatus of claim 1 wherein the predetermined number of clock periods is two.

4. The apparatus of claim 1 wherein the multivibrator oscillates at a frequency of 250 kHz.

* * * * *